United States Patent [19]

Netznik

[11] Patent Number: 4,637,789
[45] Date of Patent: Jan. 20, 1987

[54] CUSHION FABRICATION APPARATUS

[76] Inventor: Frederick P. Netznik, 8556 Central Park Ave., Skokie, Ill. 60076

[21] Appl. No.: 732,937

[22] Filed: May 13, 1985

[51] Int. Cl.$^4$ .................... B29C 39/26; B29C 51/20
[52] U.S. Cl. .................................. 425/89; 249/112; 249/158; 249/167; 264/46.8; 264/101; 264/316; 425/112; 425/117; 425/388; 425/817 R
[58] Field of Search ............... 249/112, 141, 155, 157, 249/158, 167, 55; 425/112, 117, 89, 817 R, 193, 388; 264/46.8, 45.5, 554, 101, 313, 314, 316

[56] References Cited

U.S. PATENT DOCUMENTS

| | | | |
|---|---|---|---|
| 1,444,179 | 2/1923 | Fiala | 249/158 |
| 3,264,382 | 8/1966 | Angell et al. | 264/46.4 |
| 3,458,898 | 8/1969 | Casparis | 425/2 |
| 3,830,896 | 8/1974 | Flicker et al. | 425/2 |
| 3,999,736 | 12/1976 | Theodorsen | 249/157 |
| 4,038,014 | 7/1977 | Dusza et al. | 425/388 |
| 4,046,611 | 9/1977 | Sanson | 264/46.8 |
| 4,444,705 | 4/1984 | Kumasaka et al. | 425/817 R |
| 4,454,090 | 6/1984 | Saumell | 264/154 |
| 4,470,782 | 9/1984 | Zimmerman, Jr. et al. | 425/2 |
| 4,493,877 | 1/1985 | Burnett | 428/542.8 |
| 4,532,093 | 7/1985 | O'Malley et al. | 425/817 R |

FOREIGN PATENT DOCUMENTS 283531  1/1965  Netherlands ........................ 249/157

OTHER PUBLICATIONS

Pamphlet entitled, "Rehabilitation Engineering-Seating and Mobility Research", University of Tennessee, Memphis, Tennessee.

Pamphlet entitled, "Preventive Medicine", Jay Medical, Boulder, Colorado.

Primary Examiner—Jay H. Woo
Assistant Examiner—James C. Housel
Attorney, Agent, or Firm—Emrich & Dithmar

[57] ABSTRACT

Apparatus for fabricating a cushion contoured and fitted to the sitting support surfaces of a user includes a generally flat plate having a plurality of apertures in the upper surface thereof. Each aperture is coupled to and continuous with a duct within the flat plate, with all of the ducts coupled to a vacuum source by appropriate fittings and hoses. Mounted to the upper surface of the flat plate and in sealed engagement therewith are a plurality of rails arranged so as to form a generally rectangular structure, or form, open at the top and closed about its lateral periphery. A plaster positive having a generally flat lower surface and an upper surface conforming with the support surface to which the cushion is to be fitted is positioned within the rectangular form and a flexible, nonporous membrane is positioned over the open form and in contact with that portion of the flat plate therein as well as with the plaster positive. The vacuum source then evacuates the duct system drawing the membrane in tight-fitting contact with the plaster positive and the upper surface of the flat plate. A self-skinning polyurethane foam is then poured into the form so as to cover the membrane and is allowed to cure. Release of the vacuum allows the hardened polyurethane cushion to be removed from the form and the membrane to be separated from the plate as well as from the cushion which has a flat lower surface and an upper surface contoured in accordance with the plaster positive and the sitting support surface of the user.

22 Claims, 10 Drawing Figures

CUSHION FABRICATION APPARATUS

BACKGROUND OF THE INVENTION

This invention relates generally to the fabrication of seating cushions and is particularly directed to an apparatus and method for fabricating custom contoured back and seat cushions.

Contoured support surfaces for the seat and back portions of the supported person are highly desirable for various reasons. For example, by contouring the seating surface to the configuration and dimensions of the user, the user's weight is more uniformly spread over his entire seating surface for increased comfort. Where the user is seated for long periods, such as in the case of the wheelchair-bound, the added comfort of a contoured seating surface will be evidenced in the substantially reduced tendency for the formation of pressure sores. A contoured seating surface also provides lateral support for the user which may be particularly important for the infirm or handicapped. Where one suffers from a spinal deformity and is confined for long periods to a sitting position, the additional support and comfort may be absolutely essential for the well-being of that person. The support structures used in such contoured seats should therefore be relatively soft in consistency, yet firm enough to provide the desired support for even the most infirm.

The prior art discloses various approaches in the fabrication and construction of contoured seating surfaces. One such approach makes use of a contoured urethane foam base upon which is positioned a pad containing a fluid which generally assumes the contour of the seating surface of the user. The fluid flows through various channels internal to the pad so as to prevent the "bottoming out" of the pad. In order to accommodate the flow of fluid within the pad and to assume a range of seating surface configurations and dimensions, the pad is provided with an oversized elastic casing which results in an uneven, irregular seating surface upon which the user is positioned.

Another approach in the formation and fabrication of contoured seating cushions involves the use of an airtight flexible bag filled with a granular material which assumes the general contour of a person positioned thereon. With the person to be fitted positioned thereon, the airtight bag is evacuated in order to maintain the granular material in conformance with the seating contour of the person fitted. To maintain the desired shape, a high vacuum must be maintained within the flexible bag which is difficult, if not impossible, to maintain for sustained periods without employing expensive materials and sophisticated fabrication techniques. In addition, while under vacuum the granular material is maintained rigidly in place and presents a hard support surface for the user. In addressing the problem of maintaining a high vacuum within the bag for prolonged periods, the granular material may be coated with an adhesive which can be activated by exposing the bag to microwave radiation in order to convert the mass of granular material to a permanently rigid body. One example of this approach is taught in U.S. Pat. No. 4,493,877 to Burnett.

Other approaches to the formation of contoured seat cushions have involved the carving out and shaping of a cushion material in accordance with the user's shape and size. This approach is tedious and of limited accuracy in fitting the cushion to the user's dimensions.

Other approaches have made use of vacuum tables upon which a plaster positive of the contour of the person to be fitted is positioned with a cushion cover such as vinyl positioned over the plaster positive and the vacuum table. A foam is then poured over the cover and is allowed to cure in forming the contoured cushion. The vacuum is released, and the cushion is then removed from the vacuum table. Apparatus used in this cushion forming technique suffer from various limitations. For example, no provision is made for fabricating cushions over a wide range of width, length and depth dimensions in order to satisfy individual user requirements, particularly when applied to those suffering from extreme physical deformity. In addition, the range of contour variation is limited primarily because of the manner in which the vinyl is drawn under vacuum and limitations in the flexibility of the vinyl itself. These vacuum table arrangements have also been generally unreliable and have failed to maintain a high vacuum during the fabrication procedure resulting in inaccurately formed cushions.

The present invention overcomes all of the aforementioned limitations of the prior art by providing an apparatus and method for fabricating contoured seating cushions having a wide range of dimensions and virtually any surface configuration which may be precisely matched to the seating contour of the intended user. The apparatus and method of the present invention not only facilitates the fabrication of contoured seating cushions, but also substantially increases the reliability of the process in providing more accurately contoured cushions.

OBJECTS AND SUMMARY OF THE INVENTION

Accordingly, it is an object of the present invention to provide for the fabrication of contoured back and seat cushions.

It is another object of the present invention to fabricate seat and back cushions which may be precisely sized and contoured over a wide range of intended user dimensions and configurations.

Yet another object of the present invention is to provide an improved apparatus and method for more precisely fitting support cushions to the contour and dimensions of the support surfaces of an intended user.

Still another object of the present invention is to provide a continuously adjustable foam cushion fabrication apparatus for use in forming vinyl covered or self-skinning polyurethane seat and back support cushions.

A further object of the present invention is to provide an inexpensive, safe, easily manipulated, and precisely controllable means and method for fabricating contoured seat and back support cushions.

The present invention contemplates a method and apparatus for fabricating foam cushions which are contoured and sized in accordance with a predetermined configuration and dimensions. The cushion fabrication apparatus of the present invention includes a generally planar, horizontal vacuum plate having a plurality of apertures in the upper surface thereof. Within the vacuum plate are a plurality of ducts coupled to the upper apertures therein and connected to a vacuum pump by suitable control valves, oouplers and hoses. The vacuum in each duct is controlled by a respective vacuum valve to permit the vacuum above a selected array of apertures in the plate to be fixed as desired.

Positioned on the upper surface of the vacuum plate are a plurality of elongated, linear rails which form a closed structure, or form, open at the top and in sealed engagement with the upper surface of the vacuum plate. The rails may be securely maintained in positioned upon the vacuum table and are preferably arranged in the general shape of a rectangle. With some of the rails movable upon the vacuum table, the size of the form thus configured may be established in accordance with the desired length and width of the cushion to be fabricated.

A positive image preferably comprised of plaster of the desired contour of the cushion to be fabricated is positioned upon the vacuum table within the area defined by the aforementioned rectangular closed form such that its flat lower surface rests upon the vacuum table. A nonporous, flexible, sheet-like member, or membrane, is then positioned over the form and in contact with that portion of the vacuum table therein as well as with the upper, contoured surface of the plaster positive. A vacuum is then drawn in the various ducts within the vacuum plate so as to draw the membrane in tight, sealed contact with the form structure as well as with the vacuum table and plaster positive positioned therein. A polyurethane liquid is then poured into the form and onto the flexible membrane so as to fill the space within the form. A pivoting cover is then positioned over the open-faced form and in contact with the upper surface of the polyurethane which is then allowed to cure. The vacuum is then released, the pivoting cover lifted, and the cushion may then be removed from the form and the flexible membrane may be peeled off of the cushion's self-skinned, contoured upper surface. In one embodiment, a latex membrane is used in combination with a self-skinning polyurethane compound in forming a unitary polyurethane cushion. In another embodiment, the flexible, nonporous membrane may be comprised of vinyl or a similar material which then forms the outer surface of the cushion. The present invention permits the width, the length, and the thickness of the cushion to be established as desired over a wide, continuous range of values and allows for its surface contour to precisely match the body contour of the intended user.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
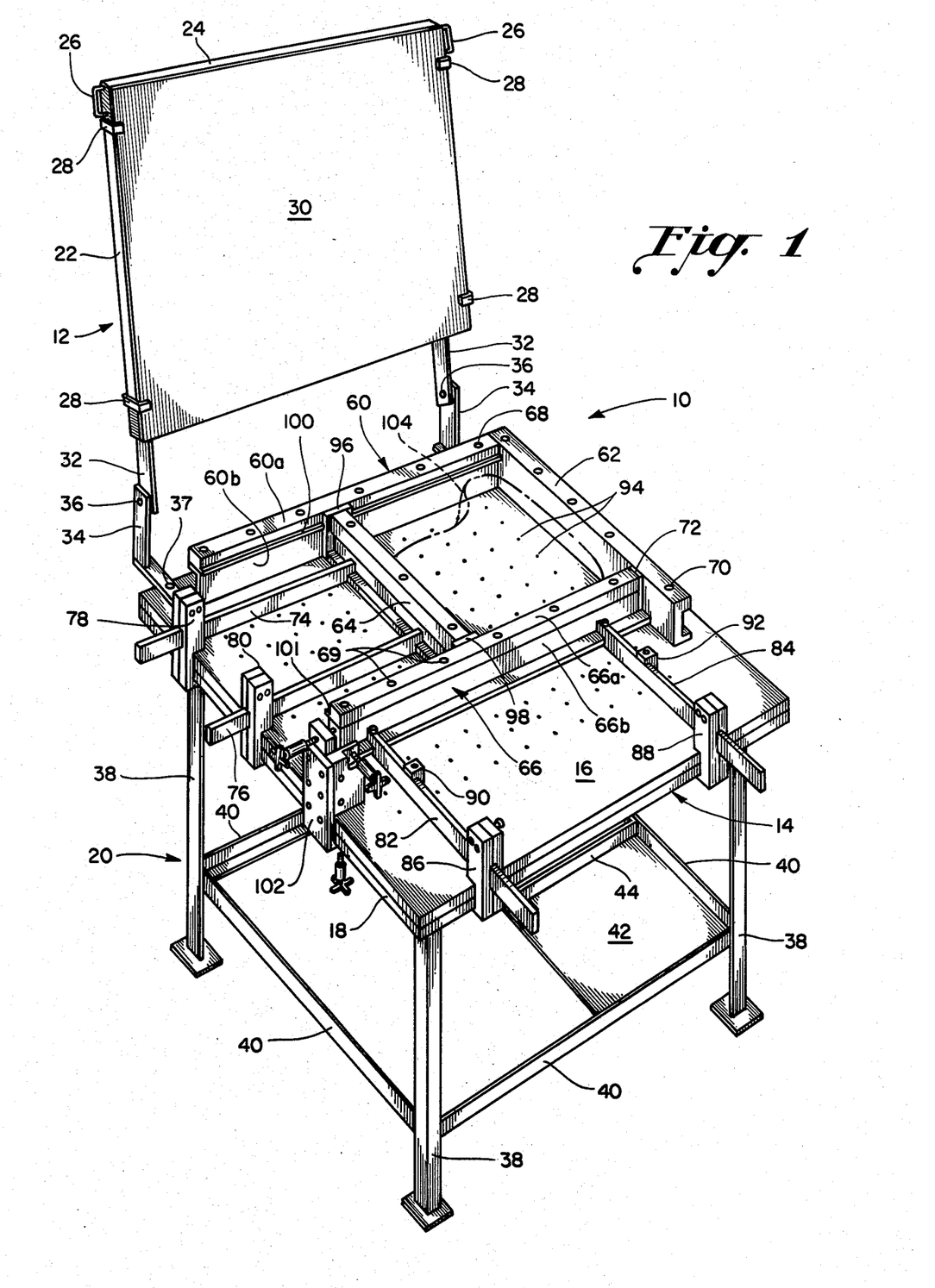
FIG. 1 is an upper perspective view of a cushion fabrication apparatus in accordance with the principles of the present invention.

Referring to FIG. 1, there is shown a perspective view of a cushion fabrication apparatus 10 in accordance with the present invention.

The cushion fabrication apparatus 10 includes a cushion cover assembly 12 pivotally coupled to a horizontal platform 14. The horizontal platform 14 includes an upper vacuum plate 16 and a lower table top 18. The vacuum plate 16 and the table top 18 are positioned in intimate contact over the entire facing surfaces thereof and may be coupled by conventional means such as bolts. The horizontal platform 14 is supported by a generally upright base or support frame 20.

The cushion cover assembly 12 includes a first pair of lateral elongated members 22, only one of which is shown in FIG. 1, and fore and aft elongated members 24, with only the fore elongated member shown in FIG. 1. The oombination of the pair of lateral elongated members 22 and the fore and aft elongated members 24 forms a generally rectangular, planar structure to which is mounted by means of a plurality of clamps 28 a cover plate 30. The cover plate 30, which in a preferred embodiment is comprised of a hard, inert plastic, extends over the entire frame of the cushion cover assembly 12 comprised of the aforementioned elongated structural members. The cover plate 30 is securely maintained in position within the cushion cover assembly 12 by means of the aforementioned clamps 28. Extending from the rear portion of the cushion cover assembly 12 are a pair of support arms 32 which are coupled by means of a respective pivot pin 36 to a respective L-shaped bracket 34. Each of the L-shaped brackets 34 is, in turn, securely mounted to the horizontal platform 14 by means of a respective mounting pin 37. As used herein, the term mounting or coupling pin is intended to cover any conventional means for coupling two members such as a conventional threaded coupler in the form of a screw, a bolt, or the combination of a nut and a bolt. With the cushion cover assembly 12 pivotally coupled to the horizontal platform 14 by means of the L-shaped brackets 34, the cover plate 30 may assume a generally upright position as shown in FIG. 1 or may be lowered to a generally horizontal orientation in close proximity to the vacuum plate 16 of the horizontal platform. A pair of handles 26 are provided on lateral portions of the cover assembly 12 to facilitate its pivoting displacement.

The support frame 20 is securely coupled to the lower surface of the table top 18 portion of the horizontal platform 14. The support frame 20 includes a plurality of vertical support members 38 and horizontal support members 40 which are coupled together so as to form a generally upright, rectangular support frame. Positioned within the support frame 20 below the horizontal platform 14 is a support tray 42 for supporting a vacuum pump 44, only a portion of which is shown in FIG. 1. The vacuum pump 44 is used to draw a vacuum within the vacuum plate 16 in fabricating a contoured cushion in accordance with the present invention as described in detail below.

Securely mounted to the vacuum plate 16 on the upper surface thereof by means of a plurality of mounting pins 68 is a stationary side rail 60. The stationary side rail 60 includes an elongated upper portion 60a and an elongated lower portion 60b which are positioned in tight fitting engagement with each other along the lengths thereof. Also positioned upon the upper surface of the vacuum plate 16 and securely coupled thereto by means of a plurality of mounting pins 70 is a stationary end rail 62. The stationary side and end rails 60, 62 are positioned in intimate, sealed contact with each other at respective adjacent ends thereof and are oriented generally 90° with respect to one another. Each of the stationary rails 60, 62 is securely mounted to the upper surface of the vacuum plate 16 and in sealed engagement therewith. Appropriate sealing means may be positioned between the abutting, adjacent ends of the stationary side and end rails 60, 62.

Also positioned upon the upper surface of the vacuum plate 16 is a movable end rail 64 and a movable side rail 66. As in the case of the stationary side rail 60, the movable side rail 66 is comprised of an elongated upper portion 66a and an elongated lower portion 66b which are coupled together along the length thereof by a plurality of coupling pins 69. Neither the movable end rail 64 nor the movable side rail 66 is directly coupled to the vacuum plate 16, but both are free to move along the surface thereof. The movable end rail 64 is positioned between and in abutting contact at respective ends thereof with the stationary side rail 60 and the movable side rail 66 and is oriented generally 90° with respect thereto. First and second corner seals 96, 98 are respectively positioned between the movable end rail 64 and the stationary and movable side rails 60, 66. Similarly, a corner seal 72 is positioned between the end of the movable side rail 66 and the stationary end rail 62 which are also oriented generally perpendicular to each other. The area upon the vacuum plate 16 defined by the stationary and movable side rails 60, 66 and the stationary and movable end rails 62, 64 is generally rectangular in shape and may be increased or decreased in size by displacing a respective movable rail toward or away from its corresponding stationary, facing rail. The facing lateral surfaces of the stationary and movable side rails 60, 66 are each provided with a respective alignment rib 100, 101 along the length thereof. With a contoured cushion formed within the space defined by the stationary side and end rails 60, 62 and the movable side and end rails 66, 64, as described in detail below, the alignment ribs 100, 101 provide a pair of elongated recessed portions in the lateral surfaces of the cushion. The lateral recessed portions within the cushion may be used as handles for gripping the cushion or they may be used for mounting the cushion in a support frame (not shown). In addition, the depth of the form comprised of the aforementioned stationary and movable side and end rails is determined by the height of each of these elements. By varying the height of these various rails above the vacuum plate 16, such as by positioning additional rail elements upon one another, the depth or thickness of the fabricated contoured cushion may be established as desired.

Positioned within the area defined by the aforementioned rails is a positive form 104 (shown in dotted line form) having an upper surface representing the contoured seat or back surface of the person for whose use the cushion is being fabricated. The lower surface of the positive form 104 is generally flat and conforms with the upper surface of the vacuum plate 16. The positive form 104 may be formed in any conventional manner, with a preferred apparatus for this use described in Applicant's co-pending application entitled "Adjustable Molding Frame", filed May 7, 1984 and issued U.S. Pat. No. 4,525,130 on June 25, 1984. The positive form 104 may be comprised of wood, metal, epoxy, clay or plaster, with the latter the preferred material, and hence this portion of the invention is hereinafter referred to as a plaster positive.

As shown in FIG. 1, the stationary end rail 62 generally defines the forward portion of the cushion being fabricated, while the movable end rail 64 is positioned immediately adjacent to the rear portion of the cushion. Similarly, the stationary and movable side rails 60, 66 define the sides, or lateral edges, of the cushion. By positioning the movable end rail 64 along the length of the stationary and movable side rails 60, 66 in spaced relation with the stationary end rail 62, the length of the cushion being fabricated may be established as desired. Similarly, the positioning of the movable side rail 66 along the length of the stationary end rail 62 determines the width of the cushion. It is to be noted that as the position of the movable side rail 66 along the stationary end rail 62 changes, the length of the movable end rail 64 must also change in order to maintain the generally rectangular, closed configuration of the paired movable and stationary end and side rails. Because the width of the cushion is generally designated in one of several standard sizes depending upon the support frame in which the cushion is to be positioned, various movable end rails 64 of different lengths will be required to accommodate the fabrication of cushions of varying widths. In one arrangement, a telescoping movable end rail capable of assuming a range of lengths may be used in providing for the fabrication of cushions having a range of selected widths.

Positioned on adjacent edges of the horizontal platform 14 are adjustable edge clamps 78, 80 and 86, 88. The adjustable edge clamps 78, 80 are respectively coupled to and engage first and second movable hold down rails 74, 76. The first and second movable hold down rails 74, 76 are each, in turn, respectively coupled to a lower portion of the movable end rail 64. Similarly, each of the adjustable edge clamps 86, 88 is coupled to and engages a respective third and fourth movable hold down rail 82, 84. One end of each of the third and fourth movable hold down rails 82, 84 is coupled to a lower portion of the movable side rail 66. In addition, adjustable top clamps 90, 92 are securely mounted upon the vacuum plate 16 and respectively engage the third and fourth movable hold down rails 82, 84 along an intermediate portion of the length thereof. Similar adjustable top clamps may be coupled to the vacuum plate 16 and to the first and second movable hold down rails 74, 76, although these are not shown in the figure for simplicity. Each respective pair of an adjustable edge and top clamp as well as a hold down rail provides for the secure positioning of a movable rail upon the vacuum plate so as to maintain sealed engagement therebetween. In addition, this clamp and rail arrangement allows for the lateral displacement of the movable rails along the vacuum plate 16 so as to permit the fabrication of cushions having a range of lengths and widths. With the movable end and side rails 64, 66 positioned as desired upon the vacuum plate 16 in accordance with a given cushion size, each of the hold down rails may be securely maintained in a locked position as described below with respect to FIGS. 5 and 6.

Figure 2:
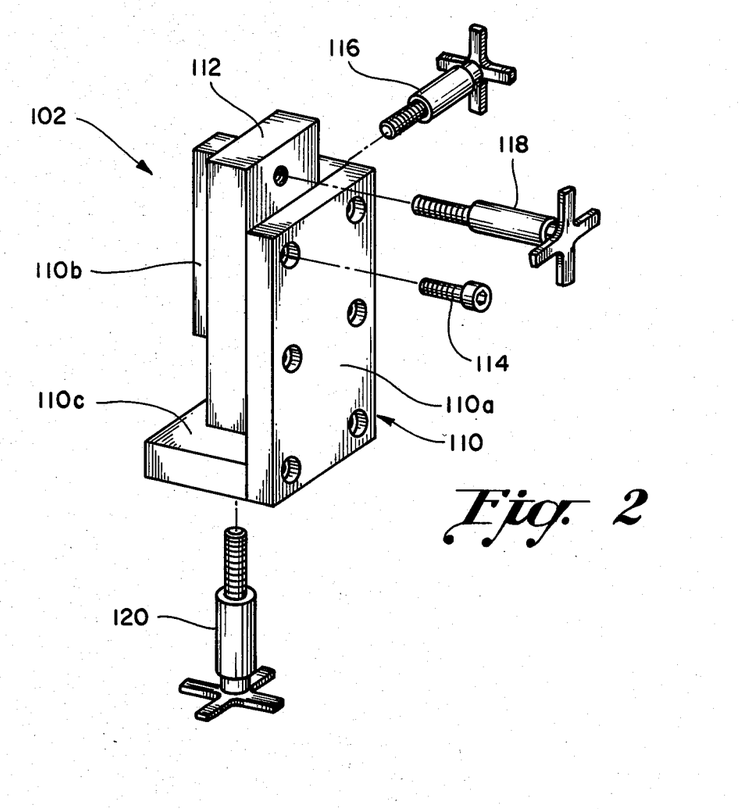
FIG. 2 is an exploded perspective view of an adjustable corner rail clamp for use in the cushion fabrication apparatus of FIG. 1.
Figure 3:
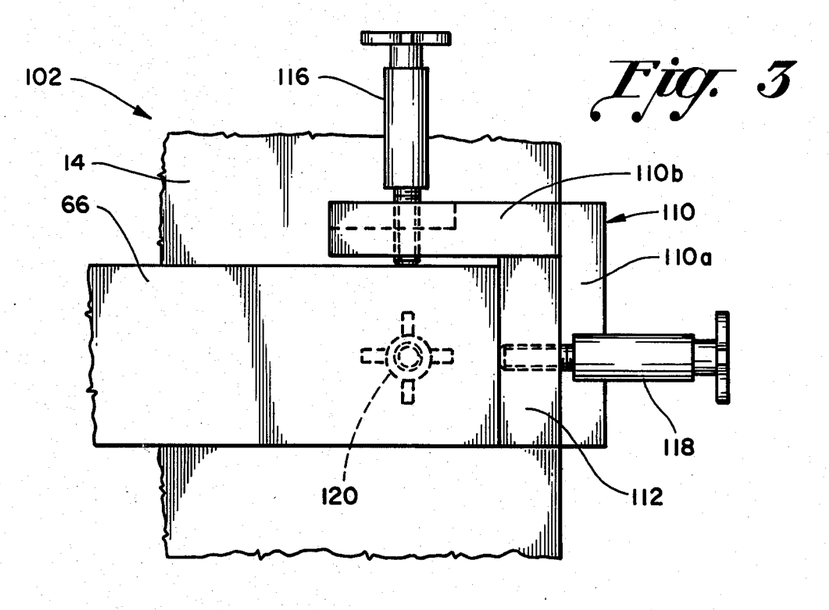
FIG. 3 is a top view shown partially in phantom of the adjustable corner rail clamp of FIG. 2 shown in position on the cushion fabrication apparatus.
Figures 4, 5:
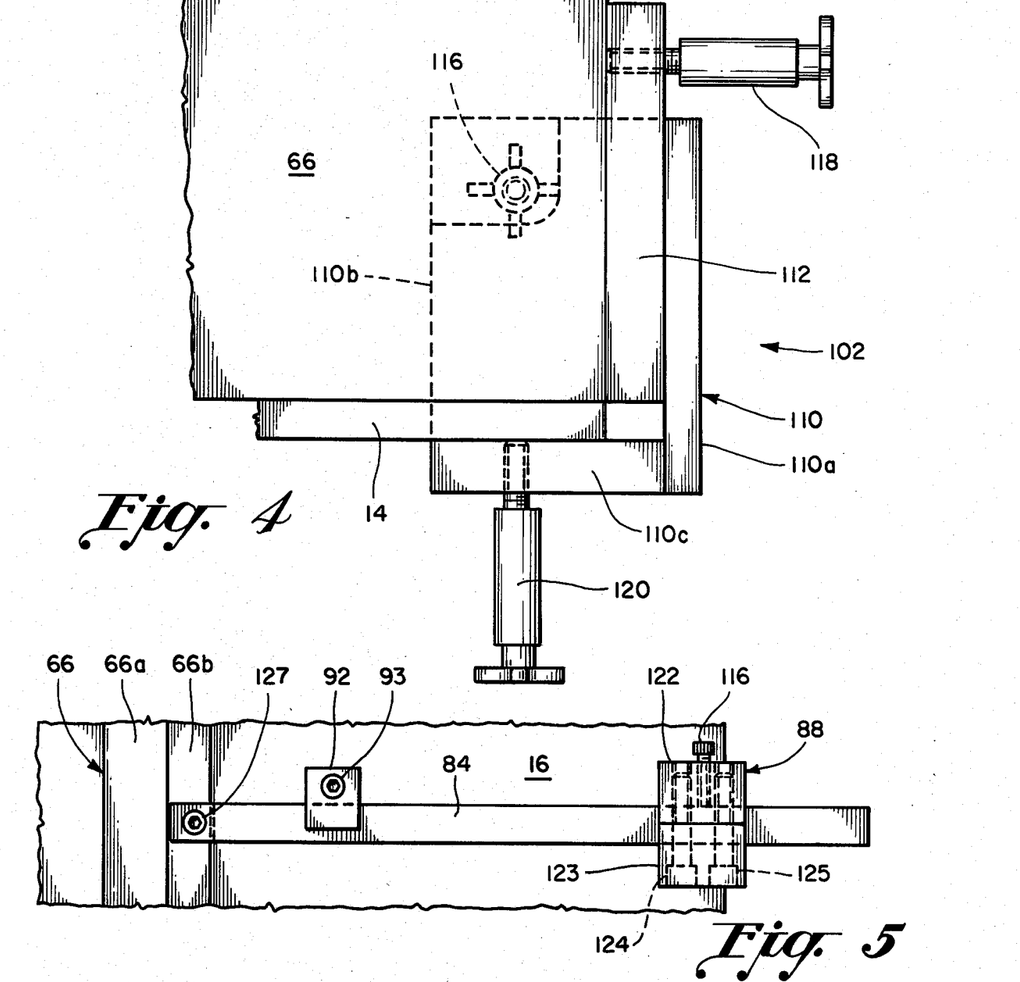
FIG. 4 is a side view shown partially in phantom of the adjustable corner rail clamp of FIG. 2.
FIG. 5 is a top view of a movable hold down rail for use in the cushion fabrication apparatus of the present invention.

Referring to FIG. 2, there is shown an exploded perspective view of an adjustable corner clamp 102 for proper positioning of the free end of the movable side rail 66 upon the upper surface of the vacuum plate. FIGS. 3 and 4 respectively illustrate plan and lateral views shown partially in phantom of the adjustable corner clamp 102 of FIG. 2. The adjustable corner clamp 102 includes a generally vertically oriented, L-shaped first clamp block 110 comprised of first and second generally planar clamp elements 110a and 110b. The first and second clamp elements 110a, 110b are coupled together by means of a plurality of threaded coupling pins 114 inserted through apertures within the first clamp element 110a. A third clamp element 110c is similarly coupled to a lower portion of the first clamp element 110a by means of threaded coupling pins 114 inserted through apertures therein. Finally, a second clamp block 112 is coupled to the first clamp element 110a over respective facing surfaces thereof by means of a plurality of threaded coupling pins 114 inserted through respective apertures within the first clamp element. The lower portion of the adjustable corner clamp 102 between the third clamp element 110c and the second clamp block 112 is adapted to receive an edge of the horizontal platform 14 and to be coupled thereto by means of a threaded mounting pin 120 inserted within the third clamp element 110c. The position of the adjustable corner clamp 102 along the edge of the horizontal platform 14 may be adjusted by loosening the mounting pin 120 and sliding the corner clamp along an edge of the horizontal platform to the desired position. Once properly positioned, the mounting pin 120 may be tightened so that the upper end portion thereof engages the lower surface of the horizontal platform 14 in securely positioning the adjustable corner clamp 102 thereon.

As in the case of the third clamp element 110c, mounting pins 116 and 118 are respectively inserted within the second clamp element 110b and the second clamp block 112. By tightening the mounting pin 118 within the second clamp block 112, the threaded end portion of the mounting pin is adapted to engage an end portion of the movable side rail 66 and to displace the movable side rail toward the stationary end rail 62. In this manner, the corner seal 72 may be maintained in intimate, sealing engagement with a lateral portion of the stationary end rail 62 and the adjacent end portion of the movable side rail 66. Similarly, by tightening the mounting pin 116 within the second clamp element 110b, the threaded end portion of the mounting pin is adapted to engage a lateral portion of the movable side rail 66 and to displace it toward the stationary side rail 60. In this manner, the first and second corner seals 96, 98 may be maintained in tight fitting, sealed engagement with the stationary and movable side rails 60, 66 and respective ends of the movable end rail 64. The generally rectangular form defined by the stationary and movable side rails 60, 66 and the stationary and movable end rails 62, 64 thus forms a sealed structure upon the upper surface of the vacuum plate 16 which is open at the top and maintained in sealed contact with the vacuum plate in the following manner.

Figure 6:
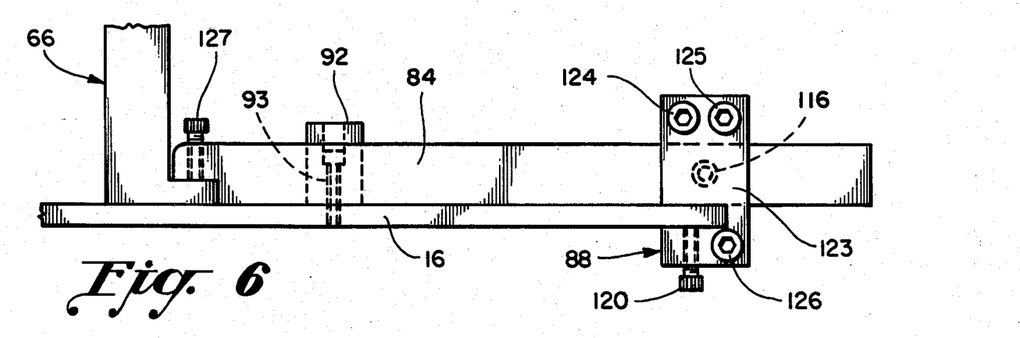
FIG. 6 is a lateral view shown partially in phantom of the movable hold down rail of FIG. 5.

Mounted to respective edges of the horizontal platform 14 are adjustable edge clamps 78, 80 and 86, 88. Each of the edge clamps 78, 80, 86 and 88 is coupled to a respective movable hold down rail 74, 76, 82 and 84 which, in turn, are coupled to the movable end and side rails 64, 66. FIGS. 5 and 6 respectively show plan and lateral views of each combination of an adjustable edge clamp and a movable hold down rail, the operation and configuration of which are described in detail in the following paragraphs.

As shown in FIGS. 5 and 6, the adjustable edge clamp 88 includes first and second clamp elements 122, 123 which are coupled together by means of threaded coupling pins 124, 125 and 126. With each of the first and second clamp elements 122, 123 including a respective, facing recessed portion, when thus coupled together the movable hold down rail 84 is positioned within the slot between the coupled clamp elements. The movable hold down rail 84 is free to move along its length within the adjustable edge clamp 88, with a threaded coupling pin 116 provided therein for engaging the movable hold down rail 84 and preventing its movement within the adjustable edge clamp. As shown in FIG. 6, the adjustable edge clamp 88 may be securely mounted upon an edge of the horizontal platform 14 by means of a mounting pin 120.

The movable hold down rail 84 is engaged at an intermediate point along the length thereof by means of an adjustable top clamp 92. The adjustable top clamp 92 is mounted to the upper surface of the vacuum plate 16 by means of a threaded mounting pin 93. The inner end portion of the movable hold down rail 84 is provided with a notched portion which is adapted for positioning over a lower flange portion of the movable side rail 66. The inner end of the movable hold down rail 84 is provided with a threaded aperture through which a hold down pin 127 is inserted for engaging the movable side rail 66 and maintaining it in sealed engagement with the upper surface of the vacuum plate 16. Therefore, by proper adjustment of the edge clamp 88, the top clamp 92, and the hold down pin 127, the movable side rail 66 may be maintained in a fixed position upon and in sealed engagement with the upper surface of the vacuum plate 16. The operation and configuration of the third movable hold down rail 82 and adjustable edge clamp 86 is identical to that just described for the fourth movable hold down rail 84 and adjustable edge clamp 88 combination in maintaining the movable side rail 66 securely positioned along the length thereof upon the vacuum plate 16. Similarly, the combination of the first hold down rail 74 and adjustable edge clamp 78 as well as the combination of the second movable hold down rail 76 and the adjustable edge clamp 80 operate in a similar manner to maintain the movable end rail 64 securely positioned upon and in sealed engagement with the upper surface of the vacuum plate 16. By loosening the various aforementioned clamps, each of the movable rails may be re-positioned upon the vacuum plate 16 to allow for the fabrication of cushions having a range of lengths and widths.

Figure 7:
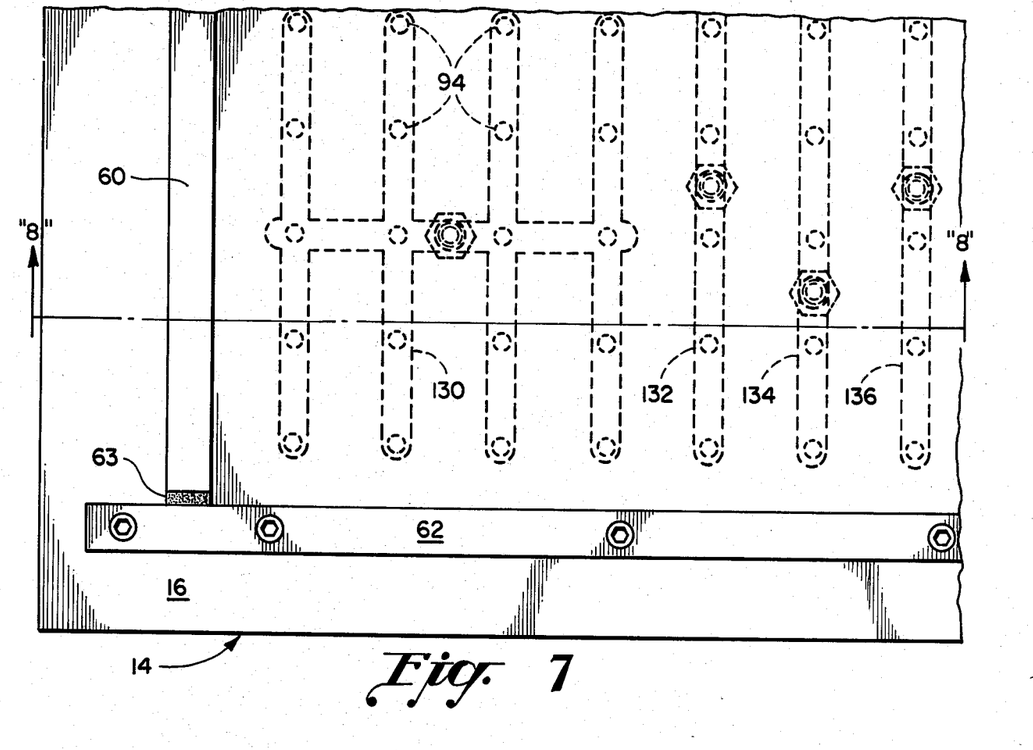
FIG. 7 is a plan view shown partially in phantom of a vacuum plate illustrating the aperture and duct configuration therein for use in the cushion fabrication apparatus of the present invention.

Referring to FIG. 7, there is shown partially in phantom a plan view of a portion of the upper surface of the vacuum plate portion 16 of the horizontal platform 14. As shown in FIG. 7, the stationary side rail 60 is oriented upon the vacuum plate 16 generally transverse to the stationary end rail 62, with a seal 63 positioned therebetween. The portion of the vacuum plate 16 to the right of the stationary side rail 60 and above the stationary end rail 62 as shown in FIG. 7 corresponds to that portion of the vacuum plate positioned within the generally rectangular closed form comprised of the aforementioned stationary rails and the movable end and side rails 64, 66.

Figure 8:
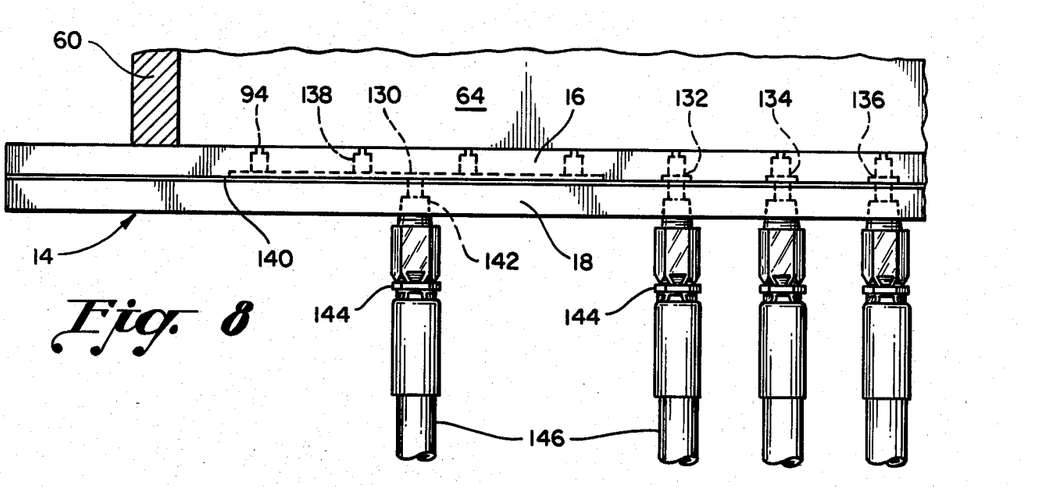
FIG. 8 is a sectional view of the vacuum plate of FIG. 7 taken along sight line 8—8 therein.

Referring to FIG. 8, which is a sectional view of the portion of the horizontal platform 14 shown in FIG. 7 taken along sight line 8—8 therein, it can be seen that a gasket 140 is positioned in sealed engagement between the upper vacuum plate 16 and the lower table top 18. The cross sectional view of FIG. 8 is taken toward the movable end rail 64 and along the length of the stationary side rail 60. Positioned within a lower portion of the vacuum plate 16 and in the general form of slots therein are a plurality of vacuum ducts or channels 130, 132, 134 and 136. Each of the vacuum channels is in the form of a thin slot, or series of coupled slots, in the lower surface of the vacuum plate 16. As shown in the figure, the vacuum channel 130 is in the form of a grid consisting of a network of coupled vacuum channels, while each of the vacuum channels 132, 134 and 136 is in the form of a single, elongated slot in the lower surface of the vacuum plate 16.

Coupled to and continuous with each of the individual vacuum channels are a plurality of vacuum bores 138. Located at the upper end of each vacuum bore 138 and extending to the upper surface of the vacuum plate 16 is a vacuum aperture 94. Extending through the gasket 140 and the table top 18 are a plurality of tapered connecting channels 142. The upper end of each of the tapered connecting channels 142 is coupled to and continuous with a respective vacuum channel. The lower end of each of the tapered connecting channels 142 is threadably connected to a vacuum fitting 144 which, in turn, is coupled to and continuous with a respective section of vacuum hose 146.

From FIG. 7, it can be seen that the vacuum channel 130 is comprised of a plurality of coupled ducts connected in a grid-like manner so as to form a single, continuous duct system. The combination of the vacuum fitting 144 and hose 146 is coupled to the entire grid-like vacuum channel 130 by means of the single tapered connecting channel 142. On the other hand, the remaining vacuum channels 132, 134 and 136 are generally linear in shape and are isolated from each other as well as from vacuum channel 130. These differences in vacuum channel configuration give rise to the capability in the cushion fabrication apparatus of the present invention to fabricate contoured cushions having a range of widths. For example, for the narrowest contoured cushion where the movable side rail (not shown in FIG. 7) is positioned over or to the left of vacuum channel 132, it will be necessary to use only the grid-like arrangement of vacuum channels 130. For the next larger width of contoured cushion, the grid-like arrangement of vacuum channels 130 as well as vacuum channel 132 may be utilized. For the widest contoured cushion, all of the vacuum channels 130, 132, 134 and 136 would be utilized to provide the largest area of evacuation upon the upper surface of the upper vacuum plate 16. The manner in which the vacuum within each of the vacuum channels is selectively controlled is described in detail below. In a similar manner, the desired length of the contoured cushion determines the length of each of the vacuum channels utilized in the fabrication of the cushion. By fixing the position of the movable end rail (also not shown in FIG. 7) along the length of the vacuum plate 16 and the vacuum channels therein, the length of the fabricated contoured cushion may be established as desired. Therefore, the positions of the movable end and side rails 64, 66 upon the vacuum plate 16 determine which and to what extent the various vacuum channels therein are to be utilized in the fabrication of a contoured cushion having a selected length and width.

Figure 9:
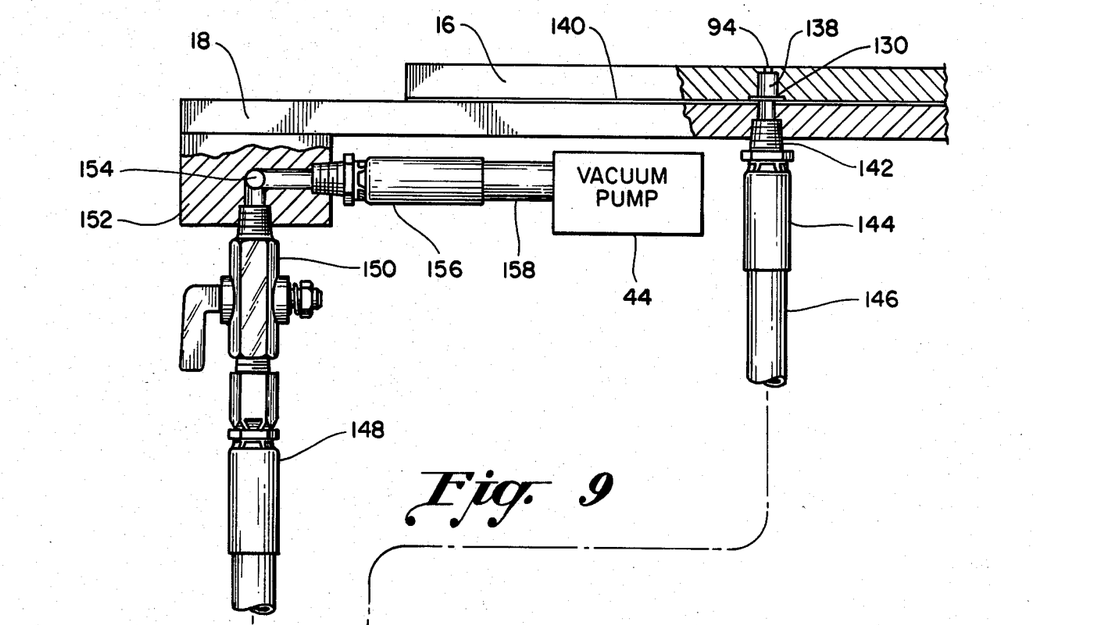
FIG. 9 is a simplified schematic diagram of a vacuum system coupled to the vacuum plate used in the cushion fabrication apparatus of the present invention.

Referring to FIG. 9, there is shown in simplified schematic form a vacuum control arrangement for use in the cushion fabrication of the present invention. As shown in the figure, secured to a lower surface of the table top 18 is a manifold 152. Positioned within the manifold 152 and extending substantially the length thereof is a manifold duct 154. The manifold duct 154 is coupled to a plurality of control valves 150, each of which is, in turn, coupled to the combination of a vacuum fitting 148 and one end of a vacuum hose 146. The other end of the vacuum hose 146 is coupled via the combination of a tapered connecting channel 142 and a vacuum fitting 144 to a vacuum channel 130. As previously described, each of the vacuum channels 130 is coupled by means of a respective vacuum bore 138 to one or more vacuum apertures 94 on the upper surface of the vacuum plate 16. In addition to being coupled along its length to a plurality of control valves 150, the manifold duct 154 is also coupled via the combination of a vacuum fitting 156 and vacuum hose 158 to the vacuum pump 44. Therefore, by manipulating a respective control valve 150, the vacuum within a respective vacuum channel 130 to which it is connected may be regulated as desired. With each vacuum channel 130 coupled to and continuous with one or more vacuum apertures 94 on the upper surface of vaouum plate 16, the vacuum above a selected portion of the vacuum plate may be controlled as desired. By increasing the area of the vacuum plate 16 over which a vacuum is drawn, the length and width of the contoured cushion being fabricated may be correspondingly increased. Similarly, evacuation of a smaller number of vacuum bores 138 permits the fabrication of smaller contoured cushions.

Figure 10:
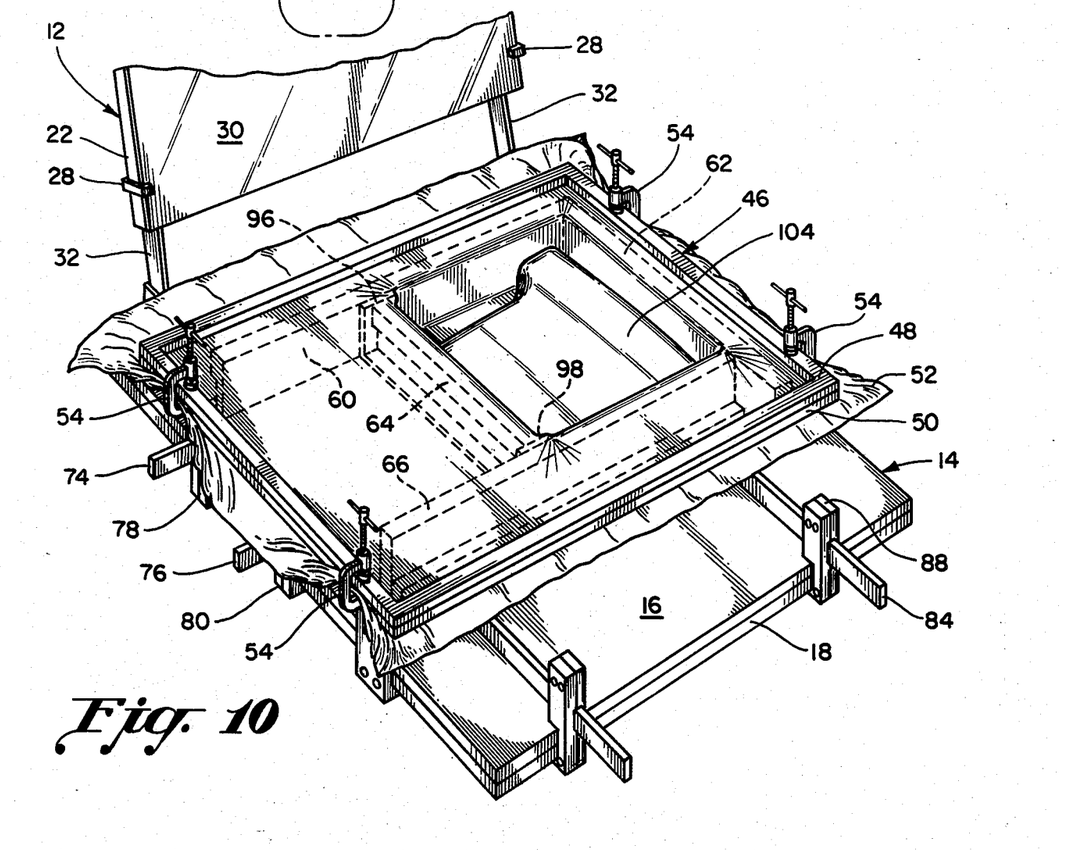
FIG. 10 is an upper perspective view of a cushion fabrication apparatus showing a nonporous, flexible membrane positioned over a vacuum table and a contoured plaster positive positioned upon the vacuum table in accordance with the principles of the present invention.

Referring to FIGS. 1 and 10, the latter of which is an upper perspective view of the cushion fabrication apparatus 10 with a positive model 104 and a flexible, elastic, nonporous separator membrane 52 in position on an upper portion thereof, the operation of the apparatus in fabricating a contoured cushion will now be described. The separator membrane 52, which preferably is comprised of a latex material, is stretched and positioned between upper and lower frame members 48, 50 of a bezel frame 46. The upper and lower frame members 48, 50 of the bezel frame 46 are coupled together with the separator membrane 52 positioned therebetween by means of a plurality of clamps 54 positioned around the bezel frame. With the separator membrane 52 securely positioned between the respective frame members of the bezel frame 46, the separator membrane is maintained in a stretched condition over the form comprised of the stationary side and end rails 60, 62 and the movable end and side rails 64, 66.

The positive model 104 is provided with a generally flat lower surface and an upper surface contoured in accordance with the seating configuration of the intended user of the cushion. The positive model 104 is positioned within the aforementioned stationary and movable side and end rails, with the lower surface thereof resting upon and in contact with the upper surface of the vacuum plate 16. The separator membrane 52 mounted to and stretched by the bezel frame 46 is then positioned over the aforementioned form and the positive model 104 positioned therein. A vacuum is drawn as previously described in a predetermined combination, or arrangement, of vacuum channels within the vacuum plate 16 in accordance with the selected length and width of the cushion to be fabricated. Evacuation of the various vacuum channels within the vacuum plate 16 defined by the space upon the vacuum plate formed by the stationary and movable end and side rails causes that portion of the separator membrane 52 positioned above the form to be pulled downward in sealed engagement with the vacuum apertures in the vacuum plate positioned between the positive model 104 and the various elongated members of the aforementioned form. The separator membrane 52 is similarly pulled tightly downward upon the plaster model 104. In a preferred embodiment, a partial vacuum may be maintained in those vacuum plate apertures positioned adjacent to the corners of the aforementioned form so as to reduce the possiblity of tearing the separator membrane 52, while those vacuum plate apertures positioned beneath the movable end and side rails 64, 66 may be disconnected from the vacuum pump 44.

An organic polymer in liquid form is then poured onto the separator membrane 52 and over the positive model 104 within the form. Polyurethane is one example of a polymer material particularly well adapted for the formation of contoured cushions in the cushion fabrication apparatus of the present invention. With the polymer foam positioned within the form defined by the stationary and movable side and end rails, the cover plate 30 is lowered over the vacuum plate 16 and is positioned in contact with the upper surface of the aforementioned form and separator membrane 52 positioned thereon. As indicated earlier, the height of the various form elements above the vacuum plate 16 determines the thickness of the fabricated contoured cushion and permits the cushion's thickness to be established as desired. With the cover plate 30 lowered in position over the form positioned upon the vacuum plate 16, the polymer foam is allowed to cure so as to form a self-skinned, resilient, solid cushion. As an example of the procedure involved in the fabrication of a contoured cushion, the polyurethane foam begins to set within approximately 20 seconds following its deposit upon the separator membrane 20 which continues for approximately one minute. The polyurethane foam then cures within 5–6 minutes whereupon it may be removed from the form and separated from the membrane 52 and assumes the form of a resilient, contoured cushion.

After the polymer foam has cured, or hardened, the vacuum within the vacuum plate 16 may be released by means of the aforementioned control valves 150 and the cover plate may then be pivotally displaced upward away from the vacuum plate 16. Release of the vacuum within the vacuum plate 16 permits the bezel frame 46 and separator membrane 52 coupled thereto to be removed from the vacuum plate. The separator membrane 52 may then be removed from the contoured surface of the positive model 104. The contoured cushion is thus provided with a surface contour complementary to the upper surface of the positive model, while the opposite, facing surface of the thus formed cushion is generally flat. The separator membrane 52 may then be removed from the thus formed cushion such as by peeling leaving only the self-skinned cushion. A conventional release agent such as a wax dispersion in petroleum hydrocarbon fraction may be deposited upon the lower surface of the cover plate 30 and the upper surface of the separator membrane 52 to facilitate removal of the cushion from the cushion fabrication apparatus 10. In another embodiment, the separator membrane may be replaced with a covering material such as vinyl which will then form a covering for the upper, contoured surface of the cushion.

There has thus been shown an improved cushion fabrication apparatus which provides for the more accurate fabrication of seating cushions uniquely contoured to the support surfaces of an intended user. The cushion fabrication apparatus provides for the fabrication of cushions over a wide, continuous range of lengths, widths and thicknesses and may be formed of a self-skinning polymer material or may be provided with a separate outer cover such as vinyl.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for fabricating from a resilient, initially fluid, curable material, a cushion having a support surface contoured in accordance with a negative of the contour of an intended user, said apparatus comprising:

a generally planar plate having a plurality of apertures in a flat upper surface thereof and including a plurality of ducts therein, wherein each of said ducts is coupled to and continuous with at least one of said apertures;

form means disposed upon the upper surface of said plate for defining a closed area thereon, said form means including a plurality of connecting members secured to the upper surface of said plate and forming a closed structure open at the top, wherein some of said connecting members are adjustably movable upon said plate to allow for the fabrication of contoured cushions having a range of lengths and widths;

a plurality of seal means positioned between adjacent connecting members so as to form a sealed, closed structure on said plate;

a positive model positioned upon the upper surface of said plate within the closed area defined by said form means, said positive model having an upper surface configured in accordance with the seating support configuration of the intended user;

a flexible, nonporous membrane positioned over said form means and in contact with the upper surfaces of said positive model and said plate within the closed area defined by said form means thereon;

vacuum means coupled to said plate for evacuating the ducts therein whereupon said membrane is drawn in tight-fitting engagement with said form means and the upper surfaces of said positive model and said plate within the closed area defined by said form means thereon so as to form a closed receptacle adapted to receive and confine the fluid material deposited therein, with a contoured cushion formed therein following the curing of said fluid material; and a plurality of control means each coupling said vacuum means to a respective duct within said plate whereby the vacuum within a selected array of apertures in said plate may be controlled in accordance with the length and width of the contoured cushion thus fabricated.

2. The apparatus of claim 1 further including adjustable hold down means coupled to said movable connecting members and to said plate for maintaining said movable connecting members securely positioned upon and in sealed engagement with the upper surface of said plate over a range of locations thereon.

3. The apparatus of claim 2 wherein said adjustable hold down means includes a plurality of mounting brackets coupled to said plate and a plurality of hold down rails each coupled to a respective mounting bracket and to a respective movable connecting member.

4. The apparatus of claim 3 wherein each of said mounting brackets is coupled to an edge of said plate and wherein one end of each of said hold down rails is securely coupled to a respective movable connecting member.

5. The apparatus of claim 4 further including a plurality of top clamps securely mounted to the upper surface of said plate and to an intermediate portion of a respective hold down rail.

6. The apparatus of claim 5 wherein said form means includes four elongated connecting members coupled so as to form a generally rectangular closed structure, wherein a first pair of adjacent elongated members are fixedly positioned upon said plate and a second pair of adjacent elongated members are movably positioned upon said plate.

7. The apparatus of claim 4 further including adjustable corner clamp means coupled to said plate and to one of said movable connecting members for urging said one of said movable connecting members in intimate contact with two other connecting members in a sealed manner.

8. The apparatus of claim 7 wherein said adjustable corner clamp means is securely mounted to an edge of said plate.

9. The apparatus of claim 1 further including a cover assembly coupled to said plate and movable between an open, upraised position and a closed position wherein said cover assembly is positioned in contact with the upper surface of the fluid material deposited within said form means and upon said membrane.

10. The apparatus of claim 9 wherein said cover assembly is pivotally mounted to said plate and includes a generally flat cover plate placed in contact with the upper surface of the fluid material when in the closed position.

11. The apparatus of claim 10 wherein said cover plate is comprised of a hard, inert plastic.

12. The apparatus of claim 11 further including a release agent deposited upon the lower surface of said cover plate to facilitate its separation from the fluid material following the curing thereof.

13. The apparatus of claim 12 wherein said release agent is comprised of a wax dispersion in a petroleum hydrocarbon fraction.

14. The apparatus of claim 1 wherein said flexible, nonporous membrane is comprised of latex.

15. The apparatus of claim 14 further including a release agent deposited upon the upper surface of said latex membrane to facilitate its separation and removal from the fluid material following the curing thereof.

16. The apparatus of claim 15 wherein said release agent is comprised of a wax dispersion in a petroleum hydrocarbon fraction.

17. The apparatus of claim 1 further including frame means for engaging and supporting said membrane in a stretched manner around said form means in maintaining said membrane in position thereon.

18. The apparatus of claim 1 wherein the height said form means extends above said plate is variable to allow for the fabrication of cushions having a range of thicknesses.

19. The apparatus of claim 1 wherein said positive model has a generally flat lower surface maintained in intimate contact with the upper surface of said plate when positioned thereon and a vacuum is drawn therein.

20. The apparatus of claim 19 wherein said positive model is comprised of plaster.

21. The apparatus of claim 1 wherein said plate includes a lower flat, solid structure and an upper vacuum plate positioned thereon and a gasket positioned between said lower structure and said upper vacuum plate.

22. The apparatus of claim 21 wherein the lower surface of said vacuum plate includes a plurality of slots therein in facing relation with said gasket.

* * * * *

UNITED STATES PATENT AND TRADEMARK OFFICE
CERTIFICATE OF CORRECTION

PATENT NO. : 4,637,789
DATED : January 20, 1987
INVENTOR(S) : Frederick P. Netznik It is certified that error appears in the above—identified patent and that said Letters Patent is hereby corrected as shown below:

Column 4, line 37, change "oombination" to -- combination --.

Column 6, line 16, after "issued" insert -- as --; and line 17, change "June 25, 1984" to -- June 25, 1985 --.

Column 10, line 39, change "vaouum" to -- vacuum --.

Column 13, line 43, (Claim 7, line 1) change "4" to -- 1 --.

Signed and Sealed this

Fourteenth Day of April, 1987

Attest:

DONALD J. QUIGG

Attesting Officer

Commissioner of Patents and Trademarks